United States Patent [19]
Hale

[11] Patent Number: 5,172,263
[45] Date of Patent: Dec. 15, 1992

[54] MULTI-PASS LASER AMPLIFIER SYSTEM
[75] Inventor: Michael O. Hale, Bellevue, Wash.
[73] Assignee: Amoco Corporation, Chicago, Ill.
[21] Appl. No.: 698,566
[22] Filed: May 10, 1991
[51] Int. Cl.⁵ .................. H01S 3/00; H01S 3/081; H01S 3/091
[52] U.S. Cl. .................... 359/347; 359/337; 372/71
[58] Field of Search ............ 359/244, 299, 337, 347, 359/348; 372/70-72, 93, 95

[56] References Cited
U.S. PATENT DOCUMENTS

| | | | |
|---|---|---|---|
| 3,732,505 | 5/1973 | Fredman | 372/71 |
| 4,074,203 | 2/1978 | Hughes | 372/70 |
| 4,093,924 | 6/1978 | Farcy | 359/347 |
| 4,119,928 | 10/1978 | Michon et al. | 359/347 |
| 4,190,812 | 2/1980 | Jacob | 372/71 |
| 4,196,403 | 4/1980 | Fry | 372/20 |
| 4,357,704 | 11/1982 | Koechner | 372/71 |
| 4,446,556 | 5/1984 | Koepf | 372/71 |
| 4,468,776 | 8/1984 | McLellan | 372/70 |
| 4,701,929 | 10/1987 | Baer et al. | 372/71 |
| 4,807,240 | 2/1989 | Goldstone | 372/70 |

OTHER PUBLICATIONS

Bahut et al.; "The Cavity of a Laser . . . Pumping"; Zhur. Prik. Spekt., vol. 20, #1, pp. 38-41, Jan. 1974.

Primary Examiner—Nelson Moskowitz
Attorney, Agent, or Firm—Stephen G. Mican; Robert J. Wagner; Frank J. Sroka

[57] ABSTRACT

A method and apparatus for injecting a pump beam into a multi-pass amplifier to achieve a high degree of pump-input beam overlap.

12 Claims, 3 Drawing Sheets

MULTI-PASS LASER AMPLIFIER SYSTEM

BACKGROUND OF THE INVENTION

This invention relates to multi-stage laser amplifier systems, and more particulary to a method and apparatus for providing interference-free multi-pass operation of laser amplifier systems.

Multi-stage amplification of laser beams is necessary in many applications to achieve the desired system gain. This is because each laser amplifier is limited in efficiency and power handling capability, so that single stage gain is often much less than desired. Numerous multi-stage amplifier systems have been devised to provide system gain requirements. One system simply comprises a series of individual amplifier stages, separately pumped, that are sequentially arranged to provide cascade amplification. Because this system uses multiple amplifier stages, pumping stages and optics, a large chain of amplifiers can become very expensive, unreliable and difficult to align.

Another system is a modification of the sequentially arranged multi-stage amplifier system, in which the amplifiers of the system are arranged in parallel to save space. The optical path of each amplifier stage output is folded over to feed the input of the following amplifier stage mounted next to it. This system is still very expensive, unreliable and difficult to align. However, this system shows how the path of the amplified beam can be folded a number of times to achieve multi-stage amplification.

A true multi-pass amplifier system folds the path of the amplified beam a multiple number of times through the same laser gain medium, allowing a single amplifier stage and pump stage to be used. This design saves space, reduces expense, increases reliability and makes alignment easier. However, in the simplest multi-pass amplifier of this type, the amplified beam overlaps itself during each pass.

An input pulse of x nanoseconds is 30 cm * x in length when it passes through a gain medium such as titanium-doped sapphire. Thus, in most amplifiers of this type, the input is present in the amplifier at the same time as subsequent passes of the amplified beam, so that interference results. Output beam quality is significantly diminished as a consequence. A variation of this type of amplifier is known as a "bow tie" amplifier, wherein the amplified beam is folded back through the same laser gain medium at different angles for each pass, so that the region of interference is limited to the vicinity of the intersection of the passes of the beam through the laser gain medium.

A multi-pass amplifier can be arranged to fold each pass of the amplified beam through the same laser gain medium in such a way that none of the passes of the beam intersect each other. The folds look much like bicycle spokes in arrangement. This type of multi-pass amplifier is described herein as a "bicycle spoke" amplifier. This design has all the advantages of the other multi-pass amplifiers, plus the additional advantage of freedom of interference between passes of the amplified beam that is folded back through the laser gain medium.

The multi-pass amplifiers according to the prior art that have a bicycle spoke configuration have one serious shortcoming, however. The overlap of the several passes of the amplified beam with the pump beam is very inefficient, because the profile of the region of the laser gain medium traversed by the passes of the amplified beam and the pump beam are so different. The pump beam has a substantially circular profile, whereas the passes of the amplified beam combine into a roughly rounded rectangular profile. Thus, a great deal of pump energy is wasted, and the gain of the amplifier is significantly restricted as a consequence.

SUMMARY OF THE INVENTION

The present invention overcomes the poor pumping efficiency of the prior art multi-pass amplifiers that have a bicycle spoke configuration with a method and apparatus for configuring the profile of the pumping beam through the laser gain medium to be nearly collinear with the profile of the region of the passes of the amplified beam through the laser gain medium. This is achieved by providing an entrance path for the pumping beam that has a relatively large angle from the paths of the amplified beam through the laser gain medium. The resulting pumping beam has a substantially elliptical profile, thus providing a substantially collinear overlap with the passes of the amplified beam through the laser gain medium.

In the preferred embodiment, the methodology for providing a high degree of overlap between a pump beam and the several substantially adjacent passes of an input beam through a gain medium of a multi-pass laser amplifier, comprises the steps of: injecting a pump beam into said laser amplifier; and adjusting the angle of said pump beam onto said gain medium to optimize the shape of said pump beam passing through said gain medium for efficient overlap of said pump beam with all passes of said input beam through said gain medium.

In the preferred embodiment, the apparatus for providing a high degree of overlap between a pump beam and the several substantially adjacent passes of an input beam through a gain medium of a multi-pass laser amplifier, comprises: means for injecting a pump beam into said laser amplifier; and means for adjusting the angle of said pump beam onto said gain medium to optimize the shape of said pump beam passing through said gain medium for efficient overlap of said pump beam with all passes of said input beam through said gain medium.

DETAILED DESCRIPTION OF THE INVENTION

Figure 1:
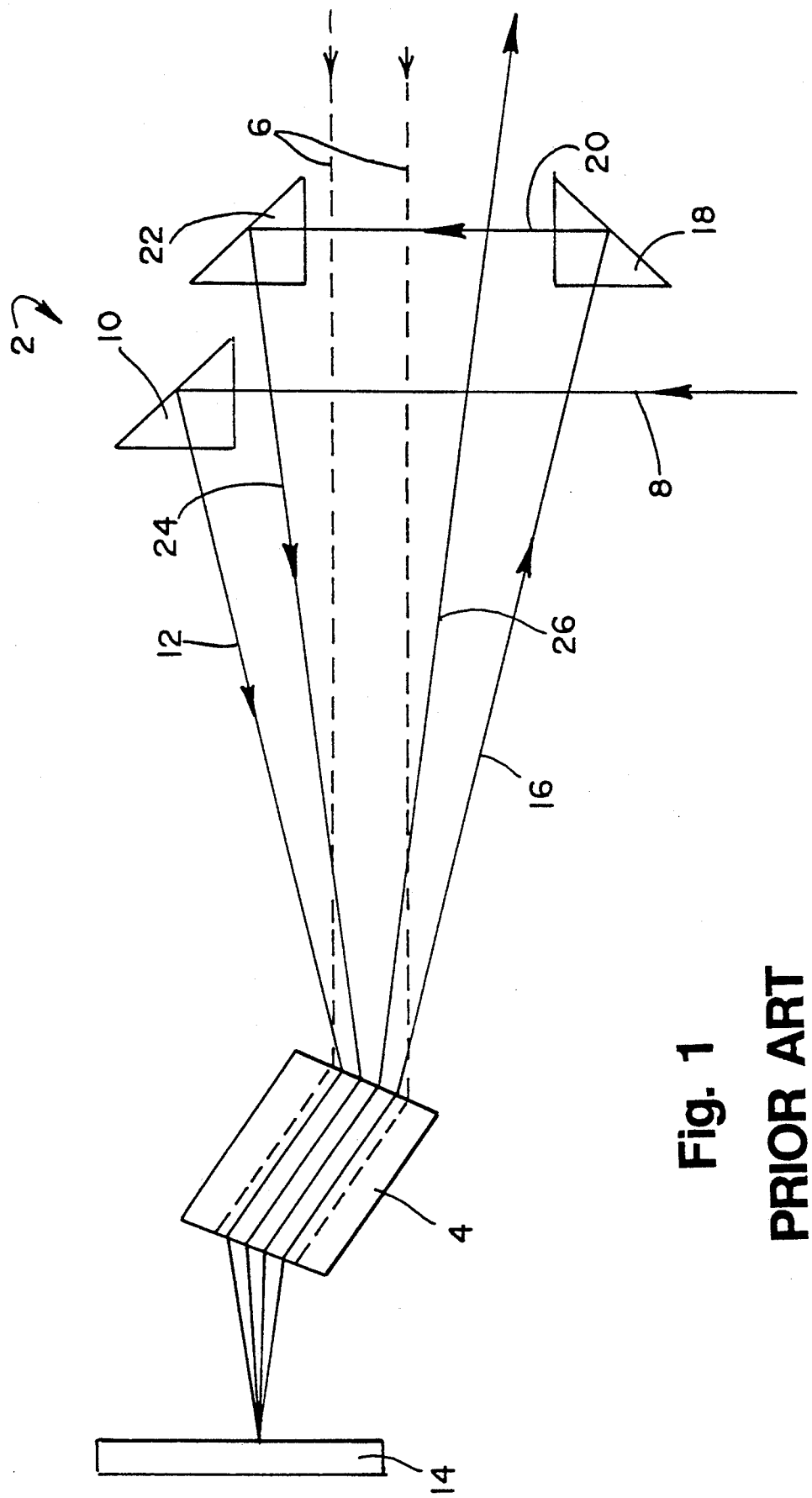
FIG. 1 is a schematic diagram of a multi-pass laser amplifier with a bicycle spoke configuration according to the prior art.

Referring to the drawings, wherein reference characters designate like or corresponding parts throughout the views, FIG. 1 shows a typical multi-pass amplifier 2 with a bicycle configuration according to the prior art. The amplifier 2 comprises a laser gain medium 4, such as a titanium-doped sapphire crystal, that is optically pumped by a pump beam represented by the region between the dashed lines 6. The amplifier 2 amplifies an input beam that enters the amplifier via an optical path 8.

The input beam is intercepted by a first turning prism 10 to change its direction so that it passes through the laser gain medium 4 along an optical path 12. After the first pass of the input beam through the gain medium 4, it is reflected off of a reflector 14 to make a second pass through the gain medium 4 along an optical path 16. The input beam is then intercepted by a second turning prism 18 that changes the direction of the input beam along an optical path 20, along which the input beam is intercepted by a third turning prism 22 that changes the direction of the input beam so that it makes a third pass through the gain medium along an optical path 24.

After the third pass of the input beam through the gain medium 4, it is reflected off of the reflector once again to make a fourth pass through the gain medium along an optical path 26, and the input beam exits the amplifier along the optical path 26 after having been amplified by the laser gain medium four times, once for each pass through the gain medium 4. All of the four passes of the input beam are adjacent and slightly divergent, like the spokes of a bicycle wheel.

Of course, for amplification to occur, the gain medium 4 must be suitably pumped by the pump beam, as represented by the region between the dashed lines 6. For instance, when the input beam is in the range of 800 nm and the gain medium 4 is titanium-doped sapphire, a pump beam with a wavelength of 532 nm is suitable. The pump beam must overlap the input beam for all of its passes through the gain medium 4 to provide effective four stage amplification of the input beam.

However, the overlap efficiency of the amplifier 2 shown in FIG. 1 is very poor, because the pump beam must pump a very high volume of the gain medium 4 in order to overlap all the passes of the input beam through the gain medium 4. Because of the distribution of the passes of the input beam through the gain medium, like the spokes of a bicycle wheel, a very large diameter pump beam is required to overlap all of the input beam passes through the gain medium 4.

Figure 2:
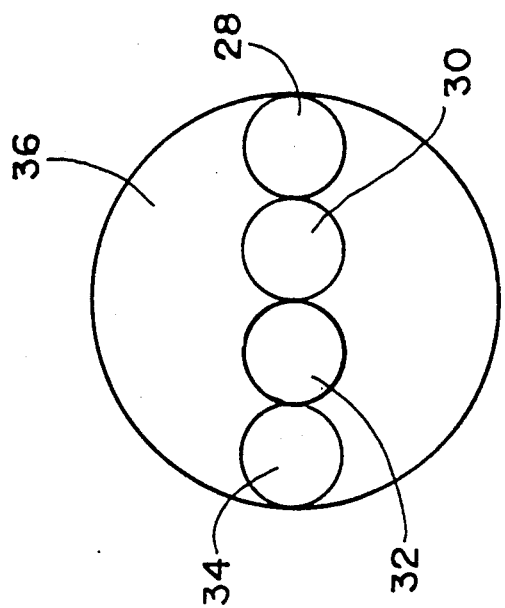
FIG. 2 is a profile of the pump and amplifier beam overlap through the laser gain medium of the amplifier shown in FIG. 1.

This is illustrated in FIG. 2, wherein circular areas 28, 30, 32 and 34 represent the cross-sections of the passes of the input beam through the gain medium 4 along the optical paths 12, 16, 24 and 26, respectively. A circular area 36 that circumscribes the areas 28, 30, 32 and 34 represents the cross section of the pump beam that overlaps the input beam through the gain medium 4 through all four passes. For the amplifier 2, the diameter of the circular area 36 must be at least as large as the length of all of the adjacent areas 28, 30, 32 and 34.

It is evident that the pump beam must pump a greater volume of the gain medium 4 than is actually necessary, because its cross-sectional area overlaps so poorly with the respective cross-sectional areas of the passes of the input beam along the length of the gain medium 4. Ideally, the pump beam should be approximately collinear with, and have the same profile as, the passes of the input beam through the gain medium for highest pump overlap efficiency.

Figure 3:
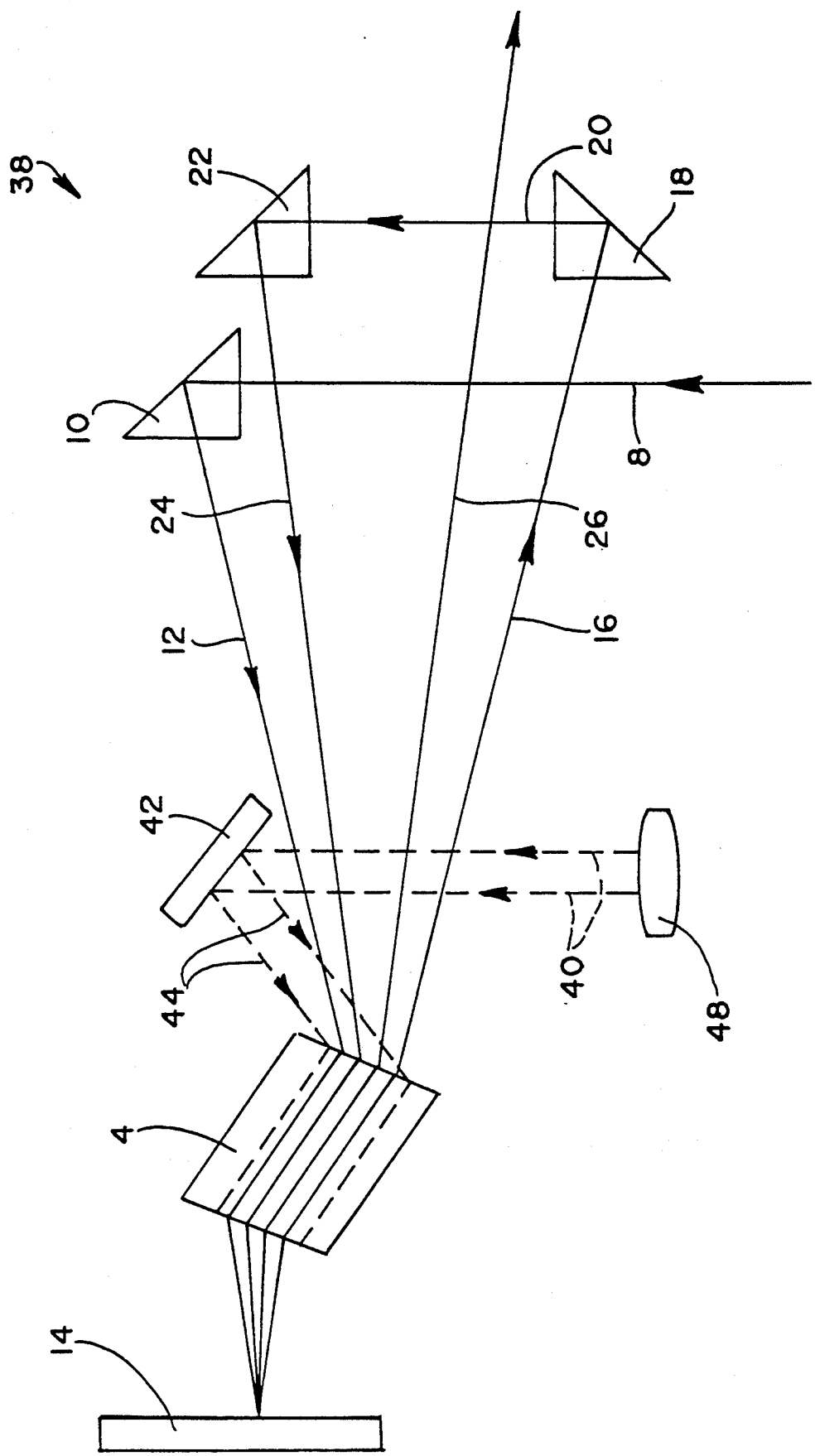
FIG. 3 is a schematic diagram of a multi-pass laser amplifier with a bicycle spoke configuration according to the preferred embodiment.

FIG. 3 shows a schematic diagram of a multi-pass amplifier 38 of the bicycle spoke type according to the preferred embodiment of the invention that has much higher pump beam overlap efficiency than the amplifier 2 shown in FIG. 1. The configuration and operation of the amplifier 38 is much the same as the amplifier 2, but the pump beam is injected into the gain medium 4 in a completely different manner. In FIG. 3, the pump beam entering the amplifier 38 is represented by the region bounded by dashed lines 40. The pump beam is intercepted by a pump beam reflector 42 that changes the direction of the pump beam to pass through the gain medium 4 having a path represented by the region bounded by dashed lines 44.

Figure 4:
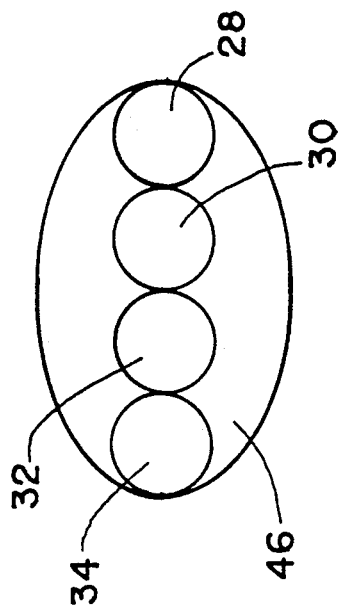
FIG. 4 is a profile of the pump and amplifier beam overlap for the preferred embodiment shown in FIG. 3.

Because of the steep angle at which the pump beam strikes the surface of the gain medium relative to the associated angles of the several passes of the input beam, the pump beam has a substantially elliptical cross-sectional area through the gain medium 4 that overlaps the respective areas of the passes of the input bean through the gain medium 4 much more closely than the pump beam with the amplifier 2. This is illustrated in FIG. 4, wherein the cross-sectional area of the pump beam through the gain medium 4 is represented by a substantially elliptical area 46 that circumscribes the respective cross-sectional areas 28, 30, 32 and 34 of the passes of the input beam through the gain medium 4.

It is evident that the overlap of the pump beam and the passes of the input beam through the gain medium 4 is much closer than with the amplifier 2, so that much higher pump overlap efficiency results. This is primarily due to the steep angle at which the pump beam enters the gain medium 4 relative to the passes of the input beam. In contrast, the cross-sectional area of the pump beam in the 2 remains substantially circular because it enters the gain medium 4 at a very small angle relative to the passes of the input beam through the gain medium 4.

The pump beam that is injected into the amplifier 38 may have a much smaller diameter than that of the pump beam for the amplifier 2, because it is stretched along one axis to overlap the adjacent passes of the input beam by the angle at which it strikes the surface of the gain medium 4.

The pump beam may be converged with a lens 48, as shown in FIG. 3, if desired, to give it a tapered beam shape that fits the bicycle pattern of the passes of the input beam through the gain medium 4 even more closely. The tapered pump beam with its elliptical cross section provides a very high degree of pump beam overlap efficiency, allowing high amplification with moderate amounts of pump beam intensity and amplifier heat dissipation.

Thus there has been described herein a method and apparatus for injecting a pump beam into a multi-pass amplifier to achieve a high degree of pump-input beam overlap. It will be understood that various changes in the details, materials, steps and arrangements of parts that have been described and illustrated above in order to explain the nature of the invention may be made by those of ordinary skill in the art within the principle and scope of the present invention as expressed in the appended claims.

That which is claimed is:

1. A method for improving overlap between a pump beam and a plurality of substantially adjacent passes of an input beam through a gain medium of a multi-pass laser amplifier, comprising the steps of:
   injecting a pump beam into said laser amplifier; and
   adjusting the angle of said pump beam onto said gain medium to modify the shape of said pump beam passing through said gain medium to closely approximate the volume of said gain medium illuminated by said plurality of passes of said input beam for efficient overlap of said pump beam with all passes of said input beam through said gain medium.

2. The method recited in claim 1, further comprising the step of converging said pump beam to improve overlap of said pump beam with all passes of said input beam through said medium.

3. Apparatus for improving overlap between a pump beam and the several substantially adjacent passes of an input beam through a gain medium of a multi-pass laser amplifier, comprising:
   means for injecting a pump beam into said laser amplifier; and
   means for adjusting the angle of said pump beam onto said gain medium to modify the shape of said pump beam passing through said gain medium for efficient overlap of said pump beam to closely approximate the volume of said gain medium illuminated by said plurality of passes of said input beam with all passes of said input beam through said gain medium.

4. The apparatus recited in claim 3, further comprising means for converging said pump beam to improve overlap of said pump beam with all passes of said input beam through said medium.

5. The method recited in claim 1, wherein the step of adjusting the angle of said pump beam comprises adjustment of the shape of said pump beam to have a substantially ellipsoid cross-sectional area.

6. The method recited in claim 1, wherein the step of adjusting the angle of said pump beam comprises the step of changing the cross-sectional area of said pump beam from substantially circular to substantially ellipsoid.

7. The method recited in claim 2, wherein the step of converging said pump beam comprises convergence of said pump beam to have a substantially tapered beam shape that substantially overlaps all passes of said input beam.

8. A method of improving overlap between a pump beam and a plurality of substantially adjacent passes of an input beam through a gain medium of a multi-pass laser amplifier, comprising the steps of:
   injecting a pump beam having a substantially circular cross-sectional area into said laser amplifier;
   adjusting the angle of said pump beam onto said gain medium to change the shape of said pump beam passing through said gain medium to have a substantially ellipsoid cross sectional area that overlaps said pump beam with all of said plurality of passes of said input beam through said gain medium; and
   converging said pump beam to have a substantially tapered beam shape to improve overlap of said pump beam with all passes of said input beam through said gain medium.

9. The apparatus recited in claim 3, wherein the means for adjusting the angle of said pump beam modifies the shape of said pump beam to have a substantially ellipsoid cross-sectional area.

10. The apparatus recited in claim 3, wherein the means for adjusting the angle of said pump beam changes the cross-sectional area of said pump beam from substantially circular to substantially ellipsoid.

11. The apparatus recited in claim 4, wherein the means for converging said pump beam converges said pump beam to have a substantially tapered beam shape that substantially overlaps all passes of said input beam.

12. Apparatus for improving overlap between a pump beam and a plurality of substantially adjacent passes of an input beam through a gain medium of a multi-pass laser amplifier, comprising:
   means for injecting a pump beam having a substantially circular cross-sectional area into said laser amplifier;
   means for adjusting the angle of said pump beam onto said gain medium to change the shape of said pump beam passing through said gain medium to a substantially ellipsoid cross sectional area to overlap said pump beam with all of said plurality of passes of said input beam through said gain medium; and
   means for converging said pump beam to have a substantially tapered beam shape to improve overlap of said pump beam with all passes of said input beam through said gain medium.

* * * * *